(12) United States Patent
Hörmann

(10) Patent No.: US 6,418,809 B1
(45) Date of Patent: Jul. 16, 2002

(54) DRIVE SPINDLE

(75) Inventor: Michael Hörmann, Halle/Westf. (DE)

(73) Assignee: Marantec Antriebs-und Steuerungstechnik GmbH & Co. KG, Marienfeld (DE)

( * ) Notice: Subject to any disclaimer, the term of this patent is extended or adjusted under 35 U.S.C. 154(b) by 0 days.

(21) Appl. No.: 09/554,212

(22) PCT Filed: Nov. 17, 1998

(86) PCT No.: PCT/EP98/07374

§ 371 (c)(1),
(2), (4) Date: Jul. 19, 2000

(87) PCT Pub. No.: WO99/25995

PCT Pub. Date: May 27, 1999

(30) Foreign Application Priority Data

Nov. 18, 1997 (DE) ..................................... 297 20 447 U

(51) Int. Cl.$^7$ ........................... F16H 25/24; E05F 11/54
(52) U.S. Cl. ..................... 74/424.71; 74/89.23; 49/199; 49/337; 160/188; 403/292; 403/299; 411/383
(58) Field of Search ........................... 74/89.23, 424.71; 49/199, 337; 160/188; 403/299, 292; 411/383, 384

(56) References Cited

U.S. PATENT DOCUMENTS

| 297,153 | A | * | 4/1884 | Muir ........................... 144/212 |
|---|---|---|---|---|
| 1,580,178 | A | * | 4/1926 | Talbot ........................... 139/79 |
| 2,473,417 | A | * | 6/1949 | Essl ........................... 123/90.17 |
| 3,266,827 | A | * | 8/1966 | Whicker ........................... 403/24 |
| 3,466,964 | A | * | 9/1969 | Wingquist ................... 411/411 |
| 4,077,268 | A | * | 3/1978 | Hill ........................... 74/424.71 |
| 4,352,585 | A | * | 10/1982 | Spalding ........................ 403/24 |
| 4,632,614 | A | * | 12/1986 | Rall et al. ..................... 409/233 |
| 4,649,016 | A | * | 3/1987 | Hardin, Jr. ................... 376/261 |
| 5,588,257 | A | * | 12/1996 | Duhame et al. .............. 49/199 |
| 5,899,319 | A | * | 5/1999 | Jarnagin ....................... 198/666 |

FOREIGN PATENT DOCUMENTS

| DE | 4307168 | 9/1994 |
|---|---|---|
| DE | 29720447 | 4/1998 |
| EP | 0485294 | 5/1992 |
| GB | 1180949 | 2/1970 |

* cited by examiner

*Primary Examiner*—Allan D. Herrmann
(74) *Attorney, Agent, or Firm*—Dilworth & Barrese LLP.

(57) ABSTRACT

The invention relates to a drive spindle, in particular to drive garage doors, having recesses or projections disposed on the circumferential surface which can be connected to corresponding projections or recesses of a guide element for the purpose of the axial movement. In accordance with the invention, the drive spindle consists of at least two components which can be detachably connected to one another.

16 Claims, 1 Drawing Sheet

DRIVE SPINDLE

BACKGROUND OF THE INVENTION

The present invention relates to a drive spindle, in particular to drive garage doors, having recesses or projections disposed on the circumferential surface which can be connected to corresponding projections or recesses of a guide element for the purpose of the axial movement of the drive spindle. Such drive spindles are widely used as machine elements to transform a rotary into a translatory movement, for example in feed drives or machine tools. For the driving of doors or gates such as garage doors, corresponding spindle drives are frequently used in place of chain or belt drives and unlike these have a relatively simple construction. Known spindle drives have the disadvantage that due to the in part substantial length of the drive spindle, the transportation to the place of assembly is difficult and complicated and that the storage of such drives requires a relatively large amount of space.

SUMMARY OF THE INVENTION

It is therefore the object of the present invention to provide a drive spindle which is easy to transport and to store.

This object is solved on the basis of a generic drive spindle in that the drive spindle consists of at least two components which can be detachably connected to each other. The individual components of the spindle advantageously possess a length which allows problem-free handling during transportation and space-saving storage. In this way, it is possible in accordance with the invention to transport and store without problems also long drive spindles which can be used to generate a correspondingly large adjustment movement. As a result, the size of the spindle drive dismantled into its component parts during transportation is not necessarily determined by the length of the drive spindle, but—for example—by the size of the guide element or of any necessary retaining device. Before being put into operation, the components of the drive spindle are assembled in an easy manner and inserted into the guide element, whereby such an assembly of the spindle drive can also be performed easily by non-specialist persons. The engaging of the projections of the guide element or spindle in the recesses of the spindle or guide element effects the desired translatory motion of the drive spindle as it rotates.

In accordance with a preferred embodiment of the present invention, the drive spindle is designed as a screw spindle with a square thread, in particular a trapezoidal thread, or a round thread. In this case, a corresponding groove-shaped recess in which the thread flanks are guided is located in the guide element.

In another embodiment of the present invention, it is provided that the circumferential surface of the drive spindle has a thread-shaped recess which can be connected to an internal thread or a projection of the guide element. Here, too, a corresponding engagement results between the drive spindle and the guide element which, as the drive spindle rotates, effects a desired translatory motion which is required to open or close a garage door, for example. The guide element can be designed with an internal thread which engages the recess of the drive spindle. It is equally possible for the guide element to possess only one projection which engages the thread-shaped recess of the drive spindle. To reduce the friction between the guide element and the drive spindle, it is equally feasible for the projection to be designed not rigidly, but as a sphere or roll. The disadvantage of such a more complex manufacture is countered by the advantage that the friction and so also the wear can be reduced with such an embodiment.

In accordance with a preferred embodiment of the present invention, the drive spindle possesses a borehole with an axial direction into which a support element is at least partially insertable. The provision of such a support element simplifies the assembly of the drive spindle on the one hand, as these can be pushed onto the support element in a simple manner and then only have to be connected to one another. On the other hand, such a support element ensures the correct radial alignment of the spindle components which is required for a trouble-free function of the spindle drive.

The support element can consist of a rope, a rod or a pipe.

It is particularly advantageous if the support element is designed as a rod or a pipe, with the rod or pipe being made of at least two parts which can be detachably connected to one another. In this way, it is possible for the support element, which may possess a substantial length in the assembled state of the spindle drive, to be dismantled into parts which can be transported without any problem.

The parts of the rod or pipe can be connectable by means of a thread. The parts of the support element which are separated from one another during transportation or storage for space reasons can be screwed together without problem during assembly. Equally, any other suitable connection technique can be used. Here, it is meaningful that first the support elements are screwed together and then the components of the drive spindle placed thereon and then connected to one another.

It is particularly advantageous if, for the transmission of the translatory motion of the drive spindle, the support element can be connected to the component to be moved, in particular to a garage door. The support element thus serves, on the one hand, the simplification of the assembly of the components of the drive spindle. They are pushed onto the support element and thus already fixed in a suitable radial position. On the other hand, if the support element is correspondingly sized or with a corresponding number of parts forming the support element, it can be used to effect the desired axial motion of, for example, a door.

An effective connection formation between the components of the drive spindle can be achieved by the components possessing serrations on their front side by means of which these can be connected. In this way, a relatively simple detachment and connection of the components is possible.

It is particularly advantages if the serrations are formed as Hirth-type serrations.

In accordance with a preferred embodiment of the present invention, it is provided that the guide element can be accepted in a retaining device. The retaining device essentially serves to fix the spindle drive to, for example, a garage ceiling. When assembling a spindle drive having the drive spindle in accordance with the invention, first, for example, the retaining device is mounted, then the components of the drive spindle and the parts of the support element are connected to each other, the drive spindle inserted in the guide element and this arrangement is finally connected to the retaining device. It is equally feasible that the guide element is fixed to the retaining device prior to insertion of the drive spindle.

The retaining device can consist of a beam. A particularly simple connection results if the guide element can be pushed into the retaining device and subsequently fixed therein.

In accordance with a preferred embodiment of the invention, it is provided that the drive spindle and/or the support element and/or the guide element and/or the retaining device have or are made of plastic. The use of plastic offers weight advantages on the one hand and, on the other, by selecting the right plastic, a wide variety of different strengths and wear properties of the components. In addition, components made of plastic are relatively cheap and can be manufactured without problems with the required features such as projections, recesses or threads. It is also possible to combine different plastics together in a suitable manner.

In another embodiment of the present invention, it is provided that the retaining device is made of steel and the drive spindle, the support element and the guide element of plastic. The use of steel for the retaining device serves the particularly secure and loadable fixing of the whole spindle drive to a wall or ceiling. To keep the weight of the entire construction low while still ensuring perfect function, the drive spindle, the support element and the guide element are made up of plastic.

BRIEF DESCRIPTION OF THE DRAWINGS

Further details and advantages of the present invention are described in more detail by means of the embodiment shown in the drawing in which the sole

DESCRIPTION OF THE PREFERRED EMBODIMENTS

Figure 1:
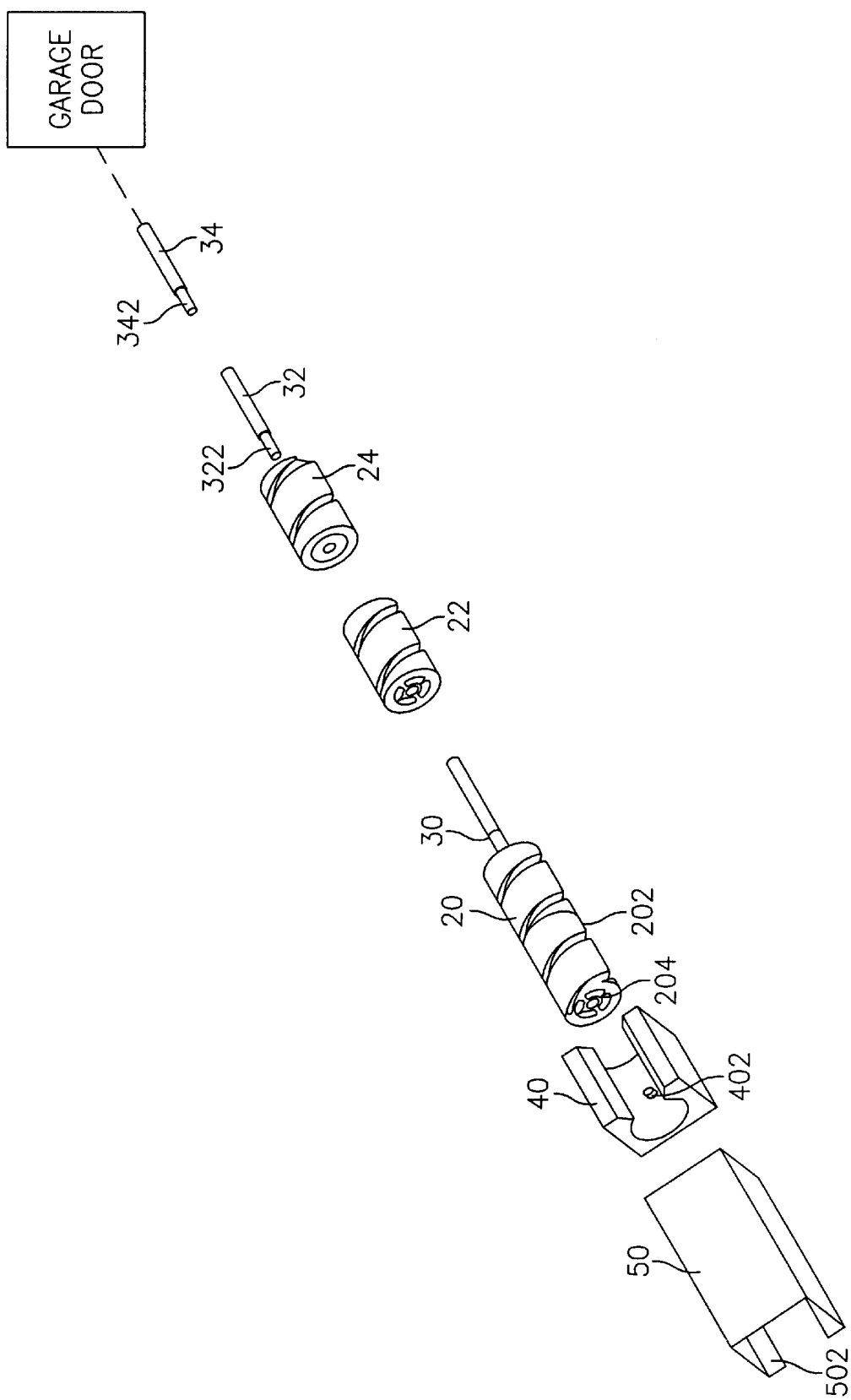
FIG. 1 shows the drive spindle in accordance with the invention with the support element in the assembled and the dismantled state with guide element and retaining device.

FIG. 1 shows the drive spindle 20 which possesses the thread-shaped recess 202 on its circumferential surface. The drive spindle 20 consists of the components 22, 24. The components 22, 24 or the drive spindle 20 possess a centrally disposed borehole 204 having an axial direction in which a support element 30 can be introduced. In the representation shown on the left of FIG. 1, the assembled support element 30 inserted into the borehole 204 of the drive spindle 20 can be seen.

The support element 30 consists of the parts 32, 34 which each possess an external thread 322 and 342 in their respective end regions. To allow the assembly of the parts 32, 34, corresponding internal thread boreholes (not shown) are provided at the ends of the parts 32, 34 opposite the external threads 322, 342.

The assembly of the spindle drive is effected, for example, in such a way that first the parts 32, 34 are connected by means of the threads 322, 342 and the corresponding internal threads. Subsequent to this, the components 22, 24 of the drive spindle 20 are pushed onto the support element 30 and connected to one another in a suitable manner, for example by means of serrations on the front side. The support element 30 is finally fixed in place, for example by means of a thread in the borehole 204 in the drive spindle 20.

Subsequently, the drive spindle 20 is inserted into the guide element 40, with the recesses 202 engaging a projection 402 disposed in the guide element 40. This arrangement is finally introduced into the retaining device 50 in which the guide element 40 is positively accepted by means of the legs 502. Depending on the embodiment, the retaining device 50 is affixed to, for example, a garage ceiling prior or subsequent to the insertion of the guide element 40.

The drive spindle in accordance with the invention allows the spindle drive to have a compact size in the dismantled state even with large spindle lengths as the drive spindle can be dismantled into components 22, 24 of any desired size. Equally, the support element 30 can be dismantable into the single parts 32, 34 so that the total dimensions of the dismantled spindle drive are determined in this case by the length of neither the drive spindle 20 nor the support element 30.

What is claimed is:

1. A drive spindle (20), having recesses (202) or projections disposed on the circumferential surface which can be connected to corresponding projections (402) or recesses of a guide element (40) for the purpose of axial movement with the drive spindle (20) formed of at least two components (22,24) which can be detachably connected to each other, wherein the drive spindle (20) has a borehole (204) with an axial direction, in which a support element (30) is at least partially insertable and is made up of at least two parts (32, 34) detachably connected to each other.

2. A drive spindle (20) in accordance with claim 1, wherein the drive spindle (20) is designed as a screw spindle with a square thread, a trapezoidal thread, or a round thread.

3. A drive spindle (20) in accordance with claim 1, wherein the circumferential surface of the drive spindle (20) possesses a thread-shaped recess (202) which is connectable to an internal thread or a projection (402) of the guide element (40).

4. A drive spindle (20) in accordance with claim 1, wherein the support element is a rope, a rod (30) or a pipe.

5. A drive spindle (20) in accordance with claim 1, wherein the support element can be connected to a component to be moved.

6. A drive spindle (20) in accordance with claim 1, wherein the guide element (40) can be received in a retaining device (50).

7. A drive spindle (20) in accordance with claim 6, wherein the retaining device (50) is a beam.

8. A drive spindle (20) in accordance with claim 6, wherein the drive spindle (20) and/or the support element (30) and/or the guide element (40) and/or the retaining device (50) have or are made of plastic.

9. A drive spindle (20) in accordance with claim 6, wherein the retaining device (50) is formed steel and the drive spindle (20), the support element (30) and the guide element (40) of plastic.

10. A drive spindle (20) in accordance with claim 1, wherein the support element (30) is connected to a component to be moved.

11. A drive spindle (20) in accordance with claim 10, wherein the component to be moved is a garage door.

12. A drive spindle (20) in accordance with claim 5, wherein the component to be moved is a garage door.

13. The drive spindle (20) in accordance with claim 1, wherein said guide element (40) is fixedly situated with respect to said rotatable spindle (20) such that as said spindle (20) rotates, rotary motion thereof is converted into translational motion of said spindle (20) with respect to said fixedly-mounted guide (40).

14. A drive spindle (20) having recesses (202) or projections disposed on the circumferential surface which can be connected to corresponding projections (402) or recesses of a guide element (40) for the purpose of axial movement, wherein the drive spindle (20) is formed of at least two components (22, 24) which can be detachably connected to each other, the drive spindle (20) has a borehole (204) with an axial direction in which a support element (30) is at least partially insertable, the support element is a rope, a rod (30) or a pipe, the rod (30) or the pipe is made up of at least two parts (32, 34), with the parts (32, 34) being detachably connectable to each other, and the parts (32, 34) of the rod (30) or pipe can be connected by a thread (322, 342).

15. A drive spindle (20) having recesses (202) or projections disposed on the circumferential surface which can be connected to corresponding projections (402) or recesses of a guide element (40) for the purpose of axial movement, wherein the drive spindle (20) is formed of at least two components (22, 24) which can be detachably connected to each other, and the components (22, 24) of the drive spindles (20) possess serrations on the front side by which the components (22, 24) can be connected.

16. A drive spindle (20) in accordance with claim 15, wherein the serrations are designed as Hirth-type serrations.

* * * * *